Feb. 12, 1963  L. P. GOTSCH ET AL  3,077,171
METHOD OF FORMING THE SIDE SEAM OF A CAN BODY
Filed April 9, 1959  2 Sheets-Sheet 1

INVENTORS
LENARD P. GOTSCH
DELBERT E. WOBBE
BY Charles H. Erne
Leland R. McCann
George W. Reifer
ATTORNEYS

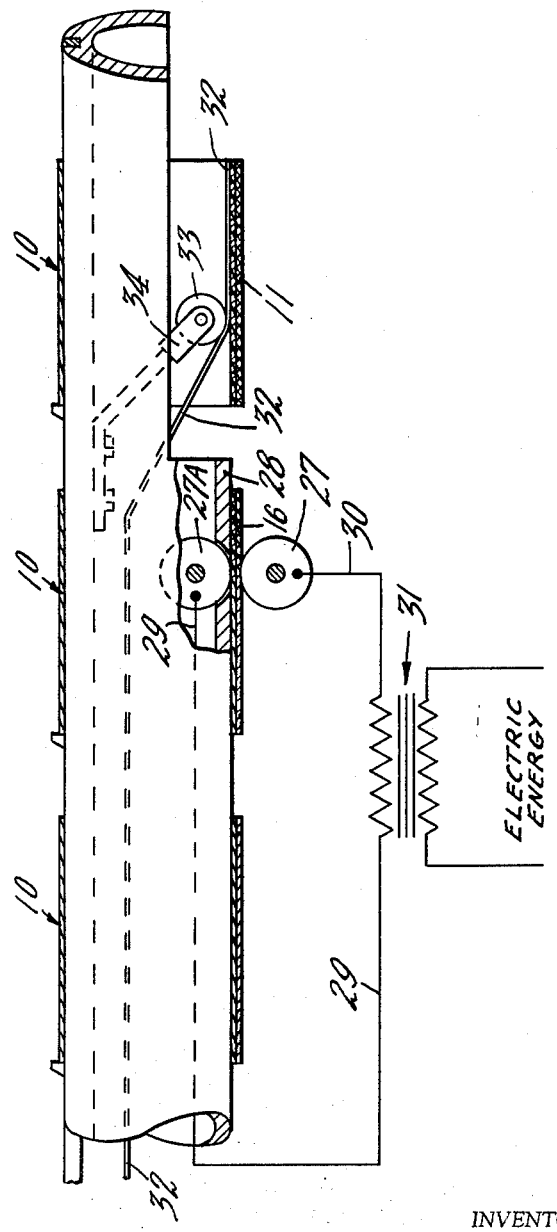

United States Patent Office 3,077,171
Patented Feb. 12, 1963

3,077,171
METHOD OF FORMING THE SIDE SEAM
OF A CAN BODY
Lenard Paul Gotsch, Barrington, and Delbert Edmund
Wobbe, Cary, Ill., assignors to American Can Company, New York, N.Y., a corporation of New Jersey
Filed Apr. 9, 1959, Ser. No. 805,341
2 Claims. (Cl. 113—120)

The present invention pertains to a method of forming the side seam of a sheet metal can or container. More particularly it pertains to a method of forming a hermetic and well protected side seam for a sheet metal can body. The instant application is a continuation-in-part of our copending application No. 503,263, filed April 22, 1955, now abandoned.

Although welding as a means of bonding the marginal edges of a sheet metal can body to form the side seam is not new, the commercial utilization of this technique has heretofore met with difficulties. One of the difficulties has been the inability to obtain a hermetic weld, i.e. a weld free of voids or potential leak passages, along the entire length of the side seam at commercially desirable speeds, such as speeds in excess of 200 cans per minute; and another difficulty has been the problem of adequately covering the bare metal left by the weld on the inside of the can so that there will be no corrosive contact between this bare metal of the weld area and the product packed in the can.

Heretofore, the bare metal of the welded side seam had to be protected by spraying a solution of a film forming resin in a volatile solvent and thereafter evaporating the solvent to leave behind over the side seam a dried film of resin. Such a procedure and construction is described in U.S. Patent 2,178,618 issued to W. E. Taylor. Although this procedure is reasonably adequate for lock seams which present a rounded surface to the striping solution, it is unsatisfactory for welded seams because the striping solution, due to capillary action, draws away from and tends to leave bare any sharp projections in the seam. One form of sharp projection present in all types of welded side seam is the small slivers or burrs of metal which project at various angles from the weld. Also, in a lap welded side seam, a step or shoulder running along each side of the weld resulting from the change from two thicknesses of metal in the seam to one thickness in the remainder of the can body presents an exposed, substantially sharp edge.

It is an object of the present invention to provide a method of forming at commercially economical speed a sheet metal can body having a hermetic, welded side seam.

Another object is the provision of a method suitable for high speed operation of forming a hermetic seal for a welded side seam of a sheet metal can.

A further object of the present invention is to provide a method of forming a body for a sheet metal can having a welded side seam that is fully protected from attack by or adverse effects on the contents of the can.

Still another object of the instant invention is to provide a method of forming a welded side seam for a sheet metal can body which body is suitable for holding products that are susceptible to contamination by metal and that generate in the can relatively high internal pressure such as beer and other carbonated beverages.

Numerous other objects and advantages of the invention will be apparent as it is better understood from the following description, which, taken in connection with the accompanying drawings, discloses a preferred embodiment thereof.

We have discovered that the above objects may be obtained by welding the opposed marginal edge portions of a sheet metal can body at a speed of 200 or more cans per minute to form a longitudinally extending side seam, placing over the welded side seam for its entire length and at least on the inside surface of the seam, a layer of a solvent free, i.e. 100% solids, synthetic resin of predetermined thickness and adhering said resin layer to said side seam and the portions of the can body wall laterally adjacent thereto. We have found that by this method any voids in the side seam due to an imperfect weld caused by high speed operation are effectively sealed by the relatively thick resin layer. Also the resin, as it is applied, is highly viscous or solid due to its solvent free state, and therefore exhibits no capillarity which would cause it to pull away or shrink from sharp edges on the surface of the weld. In this manner, the resulting resin layer effectively covers and seals off from contact with the product the entire side seam area whether its surface is rough or smooth.

Referring to the drawings:

FIG. 9 is a fragmentary view, partly in section, illustrating one form of apparatus for performing the invention continuously.

Figure 1:
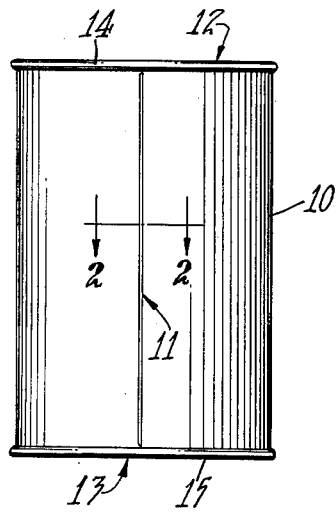
FIGURE 1 is a side elevational view of a sheet metal can having a lap welded side seam.
Figure 2:
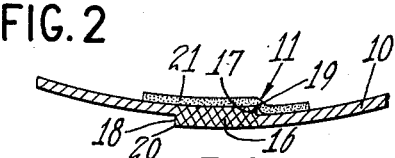
FIG. 2 is an enlarged cross-sectional view of the side seam as taken substantially along line 2—2 in FIG. 1.

As a preferred or exemplary embodiment of the instant invention the drawings illustrate a can body 10 (FIG. 1) having a welded side seam 11 and top and bottom end closure members 12 and 13 joined to the can body 10 in conventional end seams 14 and 15 respectively. Welded side seam 11 is formed preferably as a lap joint 16 (FIG. 2), which results in a shoulder or step 17 on the inside of the can body 10 along one side of the weld 16 and a similar step 18 on the outside of the body along the opposite side of the weld. These steps are formed by the change from two thicknesses of metal in the lapped area to one thickness in the adjacent body wall. Each of steps 17 and 18 has a substantially sharp edge 19, 20 extending outwardly from and longitudinally of the lap weld 16.

Disposed over and firmly adhering to the lap weld 16 and the portions of the can body laterally adjacent thereto for the entire longitudinal length of the seam is a ribbon or layer 21 of synthetic resin. The resin layer 21 is of substantially uniform thickness over the side seam 11 including the edge 19 thereby adequately covering edge 19 along with the remaining portions of the side seam and presenting a barrier between lap weld 16 and any product packed into the container.

The welded joint of the side seam is sufficiently strong to resist any of the strains to which a container is usually subjected, e.g. internal pressure, end seaming strains, handling abuse, etc. Therefore, since these strains are transmitted to the welded joint and not the resin layer 21, the cohesive strength of the layer is not especially critical. This lack of strain on layer 21 also obviates the necessity of strong adherence of the layer to the side seam area. For the purpose of the present invention, it is necessary only that the resin of layer 21 be capable of forming a continuous film and that it have sufficient adherence to the side seam area to prevent displacement of the layer during subsequent operations on or handling of the can body and finished container.

It has been found that to cover adequately all portions of the side seam and to fill any voids, pin holes or gaps that may be present in the weld, layer 21 must be at least 1 mil and preferably 3 mils in thickness. The term mil as used herein is meant to denote a lineal measurement equal to $1/1000$ of an inch. For ease of fabrication of the finished container, a practicable upper limit of thickness is found to be about 10 mils. If desired, thicker films may be used but the increased material costs and finished container fabrication difficulties more than offset any advantage gained.

The resin forming layer 21 may be of any suitable material. Among the synthetic resins useful are: polyamides, for example condensation copolymers of polymeric polyene, fatty acids and alkylene polyamines such as those described in U.S. Patent 2,379,413 to T. F. Bradley, and mixtures thereof; condensation polymers of dicarboxylic acids and alkylene diamines similar to those described in U.S. Patent 2,130,948 to W. H. Carothers (nylon); polymeric amino carboxylic acids such as those disclosed in U.S. Patent 2,071,253 to W. H. Carothers; phenolic resin for example copolymers of phenols and epichlorohydrin such as those disclosed in U.S. Patent 2,503,726 to S. O. Greenlee; oriented linear polyester resins such as those which are sold under the trade name of Mylar; high molecular weight vinyl halide resins such as highly polymerized vinyl chloride (Marvinol), and polyvinylidene chloride (Saran). The chemical intertness of the above resins which is associated with a high molecular weight or degree of polymerization, although not necessary for the resin to carry out its function of effectively sealing any leak passages is necessary to inhibit attack by the product on the resin or off-flavor in or deterioration of the product because of contact with the resin.

Figure 3:
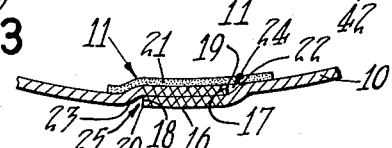
FIG. 3 is a sectional view similar to FIG. 2 but showing a modification of the lap welded seam illustrated in FIG. 2.

The irregularities produced by the steps 17, 18 can be reduced to a certain degree by the offset construction shown in FIG. 3. In this construction the body wall portion laterally adjacent step 17 is offset by being bent inwardly and the body wall portion laterally adjacent step 18 is offset by being bent outwardly to form shoulders 22, 23 respectively, forming a groove 24 running the length of the seam between step 17 and shoulder 22 and a similar groove 25 between step 18 and shoulder 23. In order to present a fairly flat surface over the entire side seam area—except for grooves 24, 25—the surface of shoulder 22 is the same radial distance from the center of the can body as is edge 19 of step 17, and the surface of shoulder 23 is the same radial distance from the center of the can body as is the edge 20 of step 18. Layer 21 completely covers the side seam area on the inside of the can body, extending across and bridging gap 24.

Figure 4:
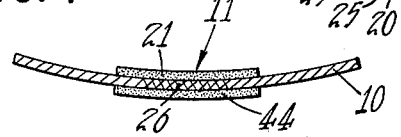
FIG. 4 is a sectional view similar to FIG. 2 but showing the instant invention in relation to a butt welded side seam.

The modification illustrated in FIG. 4 shows the opposed marginal edge portions of the can body 10 joined in a butt weld 26 having the synthetic resin layer 21 completely covering the weld and the body wall portions laterally adjacent thereto. A butt weld as shown in FIG. 4 is a highly desirable type of side seam joint since it results in a single thickness of metal in the side seam and obviates the existence of steps and sharp edges as present in the lap weld shown in FIG. 2. However, a butt welded joint is by far the most difficult type of weld to obtain at any speed approaching commercial practicality because of the extreme thinness of the metal in the can body. However, the occurrence of voids or holes in the side seam due to high speed butt welding may be disregarded because, by the application of layer 21 over the butt weld 26, the holes are effectively sealed to produce a hermetic side seam. Therefore, for the first time the present invention sets forth a commercially practicable method of forming a sheet metal can having a butt welded side seam.

Figure 5:
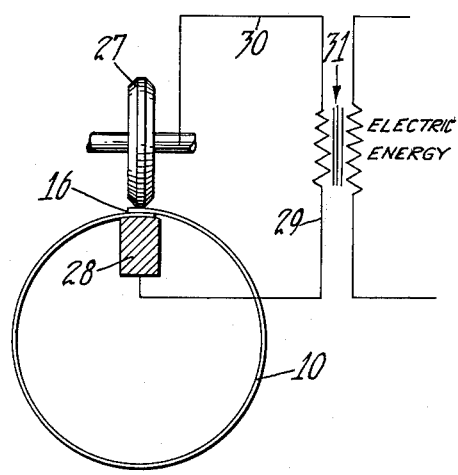
FIG. 5 is an end elevational view of a can body diagrammatically illustrating the step of welding opposed marginal edge portions of the can body by means of opposed electrodes.

According to the method of the present invention, the can body 10 is brought into cylindrical shape with its marginal edge portions overlapping, which marginal edge portions are then welded in a well known manner such as that disclosed in U.S. Patent 2,047,964 to J. M. Hothersall. As shown in FIG. 5, this welding is accomplished by an outer electrode wheel 27 which applies both forging pressure and welding current to the overlapped edges of body 10 backed up and supported by a stationary inner welding electrode 28. Both stationary electrode 28 and electrode wheel 27 are electrically connected as by lead wires 29, 30 to a suitable source of welding energy such as transformer 31. Although in FIG. 5 the technique used in welding the marginal edge portions of body 10 is that of resistance welding, it is to be understood that if desired the arc welding technique can be used. Further, instead of forming a lap joint as shown, the edge portions may be joined in a butt weld as shown in FIG. 4.

Figure 6:
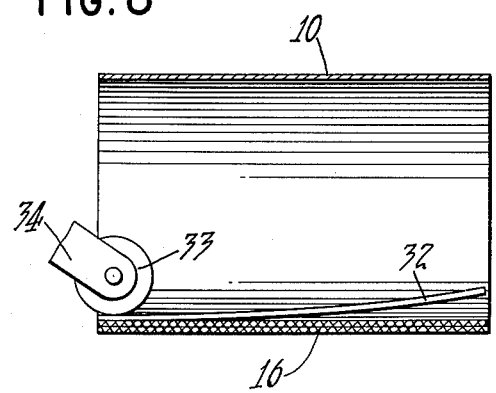
FIG. 6 is a sectional view taken longitudinally through the can body diagrammatically illustrating the step of applying a synthetic resin ribbon or layer over the side seam on the inside of the can body.

After the welding operation has been completed, the resin layer or ribbon 21 is then applied over the whole length of the lap weld 16 and its laterally adjacent body wall portions. In the application of cement layer 21 it is preferred to use a preformed film or tape 32 of the synthetic resin (FIG. 6) which is pressed firmly into contact with the weld 16 and the adjacent can body surfaces. The pressing operation may be accomplished by any suitable means such as a roller 33 rotatably mounted on a bracket 34 which is adapted to move longitudinally relative to the body 10 by means of a suitable mechanism (not shown).

Figure 7:
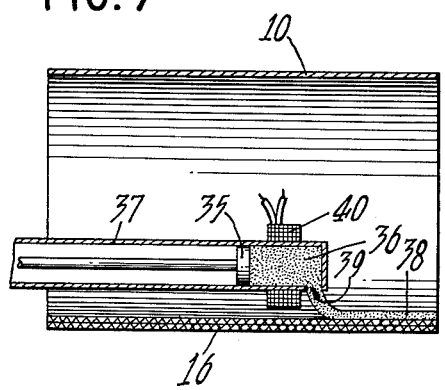
FIG. 7 is a sectional view taken longitudinally through the can body diagrammatically illustrating the step of applying the synthetic resin ribbon or layer by a means different from that shown in FIG. 6.

The modification shown in FIG. 7 illustrates a piston 35 adapted to exert pressure against a mass 36 of resinous material contained in one end of a cylinder 37 to extrude a ribbon 38 of resin through a suitable orifice 39 in the end of cylinder 37. The cylinder 37 and its piston 35 are mounted for reciprocating motion longitudinally of and relative to the can body 10 so as to extrude ribbon 38 onto and along the entire length of the side seam area. Since, in order to extrude the ribbon 38, the resinous mass 36 in the vicinity of orifice 39 should be in at least a semifluid condition, it is advantageous to heat the resin mass 36. Such heat may be supplied by an electrically heated collar 40 surrounding cylinder 37 adjacent orifice 39.

Because the resin layer 21 is in direct contact with the product packed in the finished container it is necessary that the resin layer have a high degree of inertness so that it will impart no undesirable effect to the packed product nor be affected itself by the contents of the container. The necessary degree of inertness is present in some resins as they are applied and no further treatment thereof is necessary; e.g. thick, preformed films of polyvinyl chloride (Marvinol), polyvinylidene chloride (Saran), oriented polyester resin (Mylar). Resins of this type may be provided on one surface with a pressure sensitive adhesive so that merely by pressing the adhesive coated surface onto the side seam area by any suitable means such as roller 33 described above, satisfactory adherence to and protection of the side seam may be obtained.

With other types of resinous material, maximum inertness thereof and adherence to the can body wall and side seam is obtained by imparting heat to the resin layer 21. This may be accomplished by heating the side seam area of the can body 10 before the application of the layer 21 so that the resin layer 21 is applied to a hot seam causing it to adhere thereto; or the layer 21 may be pressed onto the cold side seam area and thereafter have heat applied thereto to cause adherence and curing of the resin; or both of these operations may be performed whereby heat is applied to the side seam area, layer 21 is pressed onto the hot side seam and adheres thereto, then the covered side seam is heated again to adhere layer 21 more securely to the can body and to cure the resin.

Figure 8:
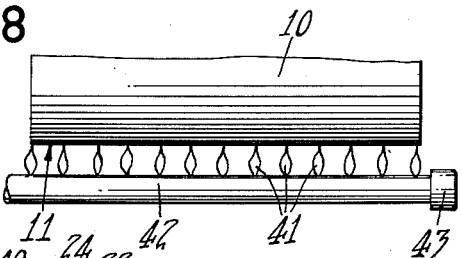
FIG. 8 is a side elevational view of a can body diagrammatically illustrating the step of heating the side seam of the can body whereby heat is transmitted to the resin ribbon or layer to cause it to adhere to the can body.

One means of imparting heat to the film 21 involves passing can body 10 (FIG. 8) over a series of gas flames 41 with the side seam 11 in contact with the flames. Flames 41 emanate from holes in pipe 42 one end of which is sealed off by cap 43 and the other end of which is connected to a source of combustible gas. When the heat from the seam is transmitted to the layer 21—from preheating the seam prior to application of the layer, from post-heating after the layer is applied, or both— the resin layer 21 softens sufficiently to wet the surface of the side seam and the can body with which it is in contact and becomes firmly bonded to the surfaces during cooling and solidification. Due to the heat transferred to the resin, a further reaction takes place within the resin layer to cause an increase in its inertness and imperviousness to attack, i.e. the resin is cured.

The preferred method of imparting heat to the film or tape 21 is to utilize residual heat from the welding operation. During the welding, side seam 11 and its immediate adjacent area is heated to about 1,000° F. or above. On the other hand, effective bonding temperatures for the tape 21 to the side seam 11 cover a range of 300 to 600 and preferably 400 to 500° F. Although there appears to be a wide differential between the temperature of the side seam 11 during welding and the temperature necessary for bonding of the resin tape 21, this differential is rapidly reduced due to the cooling effect of the remainder of the can body 10. The relatively cool can body 10 conducts the heat imparted by welding away from the side seam 11 at a rapid rate after the can body leaves the welding station. Therefore, the temperature of the side seam cools to the bonding temperature for the resin film 21 within a very brief time interval, substantially immediately, after the can body 10 leaves the welding station.

The above sequence of steps is illustrated schematically in FIGURE 9 wherein flat blanks are wrapped around a supporting mandrel or horn and moved in a straight line path of travel in a manner similar to that disclosed in the aforementioned Hothersall Patent #2,047,964. In this sequence of operations the can body 10 with unbonded but lapped marginal edges is moved to the right as viewed in FIGURE 9 through the welding station. In passing through the welding station, the overlapped marginal edges are progressively compressed between the roller electrodes 27 and 27A. Current from the secondary of the transformer 31 passes along the lead 30 into the roller electrode 27 through the lapped edges into the roller electrode 27A and thence back to the secondary of the transformer through the lead 29 thereby forming the lap weld 16.

Immediately after the welding operation and while the welded edges are still hot therefrom, the can body passes through the taping station. In this station, the tape 32, fed from a suitable source (not shown) through the hollow mandrel, is progressively pressed onto the inside surface of the hot weld by the roller 33 supported on the bracket 34 causing the tape 32 to adhere to the weld thereby forming the welded and taped side seam 11.

Between the welding and taping station, the heat of welding dissipates into the can body thereby lowering or cooling the temperature of the weld to a point where no heat degradation of the thermoplastic of the tape 32 takes place during the taping operation. However, sufficient heat remains in the weld from the welding operation to cause adherence of the tape 32. After the taping operation the can is moved off the mandrel for a subsequent operation.

It is to be understood that a layer 44 of resin similar to resin layer 21 can be disposed over the side seam area on the outside of can body 10. If no corrosion or contamination occurs by contact of the product packed, e.g. oil, with the bare metal on the inside of the side seam, outside layer 44 may be used alone. However, when there is danger of corrosion or contamination, due to exposed bare metal on the inside of the side seam, the layer 44 may be used in conjunction with the layer 21 as shown in FIG. 4. When so used, the layer 44 may be of the same or different chemical composition as the layer 21, for example nylon on the inside and Mylar on the outside. Also, the outside layer 44 may be pigmented or otherwise decorated to present a pleasing appearance in addition to functioning as a protective layer.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the method hereinbefore described being merely a preferred embodiment thereof.

We claim:

1. A method of forming a hermetic side seam for sheet metal can bodies at high speed comprising passing a plurality of sheet metal can bodies in end-to-end relation along a predetermined straight line path of travel, each of said bodies having a pair of unbonded longitudinal margins contiguous one another, welding said contiguous margins at a rate of at least 200 can bodies per minute by means of electricity whereby said margins are heated to at least 1,000° F. and fused to form a side seam, and in rapid sequence immediately after said welding while maintaining said bodies in said relation, said path of travel and at said rate cooling said side seam to from 300 to 600° F. and applying a solvent-free 100% solids layer of a synthetic resin at least one mil thick over said cooled side seam, and adhering said layer to said side seam to seal any discontinuities in said seam.

2. The method set forth in claim 1 wherein said layer is applied by extrusion onto said side seam.

References Cited in the file of this patent

UNITED STATES PATENTS

| | | |
|---|---|---|
| 2,047,964 | Hothersall | July 21, 1936 |
| 2,078,546 | Sebell | Apr. 27, 1937 |
| 2,166,598 | Kronquest | July 18, 1939 |
| 2,181,319 | Flagge | Nov. 28, 1939 |
| 2,198,630 | McManus | Apr. 30, 1940 |
| 2,362,881 | Canney et al. | Nov. 14, 1944 |
| 2,797,843 | Orlins | July 2, 1957 |

FOREIGN PATENTS

| | | |
|---|---|---|
| 295,340 | Great Britain | Aug. 7, 1928 |
| 300,933 | Great Britain | Nov. 19, 1928 |
| 479,016 | Great Britain | Jan. 28, 1938 |